United States Patent [19]

Lee et al.

[11] Patent Number: 5,415,519

[45] Date of Patent: May 16, 1995

[54] UPSTACKER AND ORIENTATION COLLATOR

[75] Inventors: John S. Lee, Coon Rapids; David J. Suden, Minneapolis, both of Minn.

[73] Assignee: Rimage Corporation, Minneapolis, Minn.

[21] Appl. No.: 64,220

[22] Filed: May 20, 1993

[51] Int. Cl.⁶ .......................................... B65G 57/30
[52] U.S. Cl. .............................. 414/795.3; 414/791.2
[58] Field of Search ............... 414/791.2, 791.3, 794.9, 414/795.3

[56] References Cited

U.S. PATENT DOCUMENTS

| | | | |
|---|---|---|---|
| 1,994,636 | 3/1935 | Donnellan | 414/791.2 |
| 3,450,275 | 6/1969 | Carlen et al. | 414/795.3 |
| 3,517,482 | 6/1970 | Beninger | 414/795.3 |
| 4,354,787 | 10/1982 | Gensike et al. | 414/791.2 |
| 4,432,685 | 2/1984 | Stauber | 414/795.3 |
| 4,569,620 | 2/1986 | Lynch | 414/791.3 |
| 4,778,323 | 10/1988 | Salts | 414/795.3 |

FOREIGN PATENT DOCUMENTS

| | | | |
|---|---|---|---|
| 633855 | 8/1936 | Germany | 414/791.2 |
| 243764 | 10/1986 | Japan | 414/791.2 |
| 1034572 | 6/1966 | United Kingdom | 414/795.3 |

Primary Examiner—Michael S. Huppert
Assistant Examiner—Gregory A. Morse
Attorney, Agent, or Firm—Palmatier, Sjoquist & Helget

[57] ABSTRACT

An apparatus as disclosed that receives, vertically stacks and directionally collates computer diskettes. The apparatus stacks the diskettes in the actual order in which they are received, with the first diskette received at the top of the stack and the most recently-received diskette at the bottom of the stack. A tray attached to a drive nut receives diskettes in a lowered position and, if appropriate, swivels the tray 90 degrees before raising the diskette into a bin opening located at the bottom of a vertical stacking bin. Retractable wedge-shaped finger members support the diskette stacked in the bin and retract as a diskette is raised. The tray and drive nut are raised and swiveled by way of a rotating shaft extending in the bore of the drive nut. The shaft has a double helical groove on its surface which is engaged by a pawl swivelably attached to the drive nut.

21 Claims, 8 Drawing Sheets

UPSTACKER AND ORIENTATION COLLATOR

BACKGROUND OF THE INVENTION

The present invention relates to the processing of computer diskettes. More particularly, the invention relates to an apparatus for vertically stacking and collating, by way of directional orientation, the diskettes.

The invention is related to the device disclosed in U.S. Pat. No. 4,910,675, issued Mar. 20, 1990, which disclosed a processing and packaging system for prerecorded computer diskettes. The present invention is suitable for use in said system or similar systems or applications.

Diskettes are often processed with several sequential diskettes comprising a set. Each individual set is then boxed or packaged. Collation of each individual set facilitates handling and packaging of the sets. Collation of articles, including diskettes, may be accomplished by several different means. One means is the insertion of flags between each set. An additional collation means is the insertion of each set in a separate bin as is often done in photostatic paper copying. Both of these techniques have attendant disadvantages. Insertion of flags requires a supply of the flagging material and the additional apparatus for insertion. Collation by separate bins requires significant additional product handling equipment along with the additional bins.

The two types of diskettes most commonly available are the 3½ inch diameter disk enclosed in a rigid plastic shell with a movable metallic shutter and the 5¼ inch diameter disk with a flexible cover and a radially-extending slot. The 5¼ inch diskettes are typically labeled and inserted into protective sleeves before they are ready for stacking and/or collating. The sleeves consist of open envelopes into which the diskettes are placed with one end of the diskette exposed. This lends toward an obvious visual distinction in the stacking of differently-oriented diskettes.

The 3½ inch diskettes are generally labeled but not sleeved before stacking and/or collating. The metallic shutter on one edge of the 3½ inch diskettes provide obvious visual distinction for differently-oriented stacked 3½ inch diskettes.

SUMMARY OF THE INVENTION

The present invention is an apparatus that receives, vertically stacks and directionally collates computer diskettes. The apparatus stacks the diskettes in the actual order in which they are received, that is, with the first diskette received at the top of the stack and with the most recently received diskette at the bottom of the stack. The apparatus orients individual or multiple diskettes in the stack in either of two orientations.

The device has a conveyor opening through which the diskettes are transferred onto a tray. The tray is attached to a drive nut which moves upwardly and downwardly and swivels 90°. The tray receives the diskettes in the lowered position and, if appropriate, is swiveled 90° and is raised into a bin opening at the bottom of a vertical stacking bin. The bin opening has several pivoting wedge-shaped finger members which support the diskettes stacked in the bin. As a diskette is raised into the bin opening, the finger members retract to receive the diskette. At the fully raised position the finger members return to their original position to support the diskette and any other diskettes previously stacked in the bin. The tray and drive nut are raised and swiveled by way of a shaft extending in the bore of the drive nut. The shaft has a double helical groove on its surface which is engaged and tracked by a pawl swivelably attached to the drive nut and extending into the bore of the drive nut. Rotation of the drive nut is restricted by an arm member protruding from the exterior of the drive nut which engages vertical channels in two vertical guides. The vertical guides are placed in a 90° orientation with respect to the drive nut to restrict rotation of the arm member between the vertical guides and to restrict vertical motion only at the vertical stop guides. Rotation of the drive nut is restricted to when the drive nut is in the lowered position. Thus, the drive nut and tray swivel between the two stacking orientations only in the lowered position and are raised or lowered only in the two orientations which are 90° apart. A frictional member is affixed at the top end of the bore of the drive nut and is engaged by the shaft when the drive nut is in the lowered position. The frictional member gives priority to the swivel motion of the tray and drive nut, when available, over the tracking of the pawl in the helical groove and the raising of the drive nut and tray. Upon reversal of the rotation of the drive shaft this priority causes disengagement of the arm member from the vertical guide at the lowered position and the drive nut and tray swivels 90° at which point the arm member engages the other vertical guide. The engagement of the other vertical guide by the arm member precludes further swiveling and continued rotation of the shaft raises the drive nut and tray with the diskette to deposit the diskette in the bin at a 90° orientation from the previous diskette.

An advantage of the invention is that the most recently stacked diskette is at the bottom of the vertical stack. This facilitates orderly packaging or further processing of the diskettes.

An advantage of the invention is that the diskettes are stacked vertically, in a single bin, minimizing the space requirements for the apparatus and providing flexibility with regard to operator attendance at the apparatus.

An additional advantage is that flags are not needed or utilized in the collating operation.

An additional advantage of the invention is the capability of the device to collate individual diskettes or sets of diskettes within the stack.

An additional advantage and feature of the invention is that the stacking and collating functions of the apparatus operate off of a single drive motor. Further, the invention has a very limited number of moving parts lending toward greater reliability.

DETAILED DESCRIPTION OF THE PREFERRED EMBODIMENTS

Figure 1:
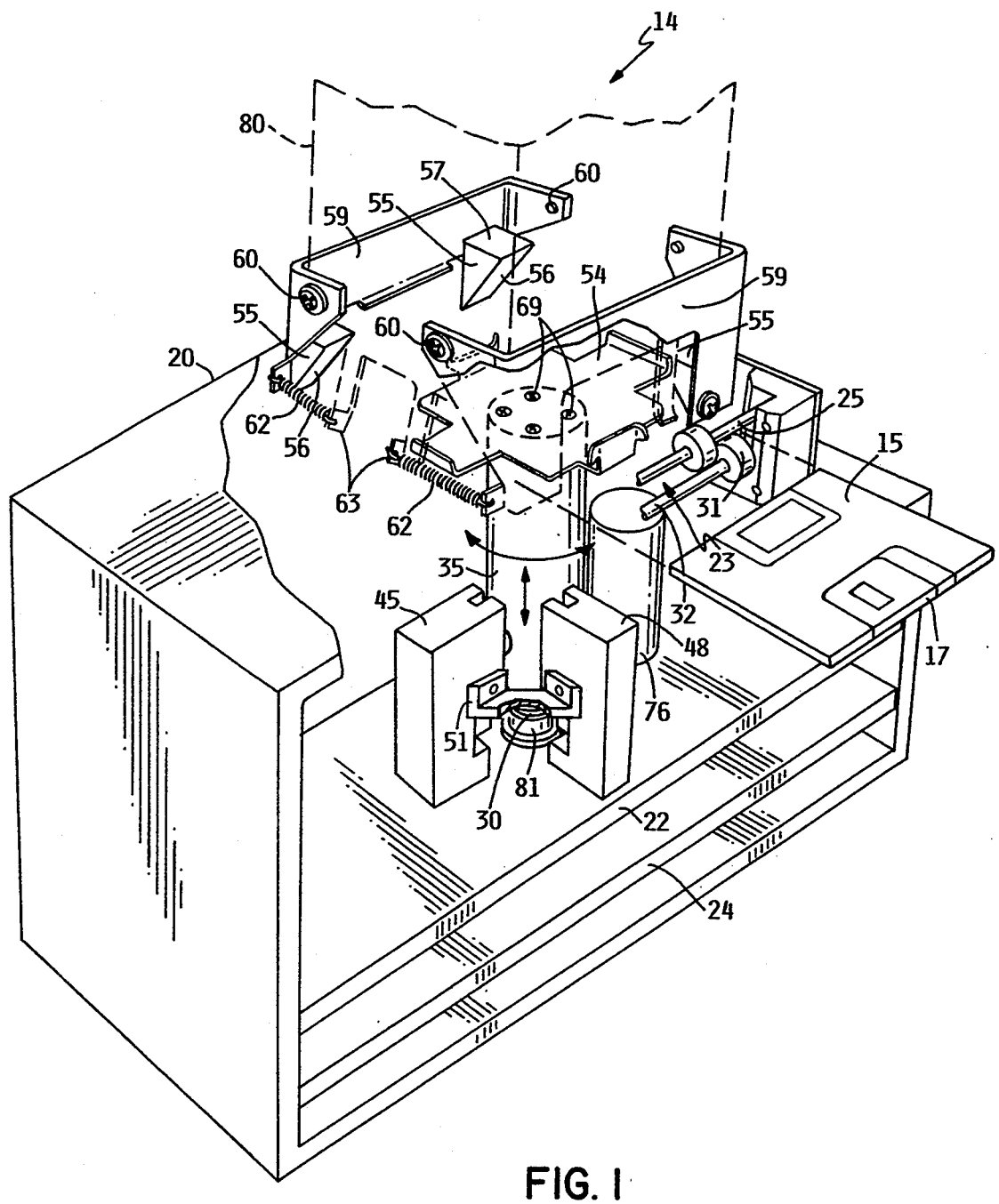
FIG. 1 is a perspective of the invention with portions of the apparatus cut away.
Figure 8:
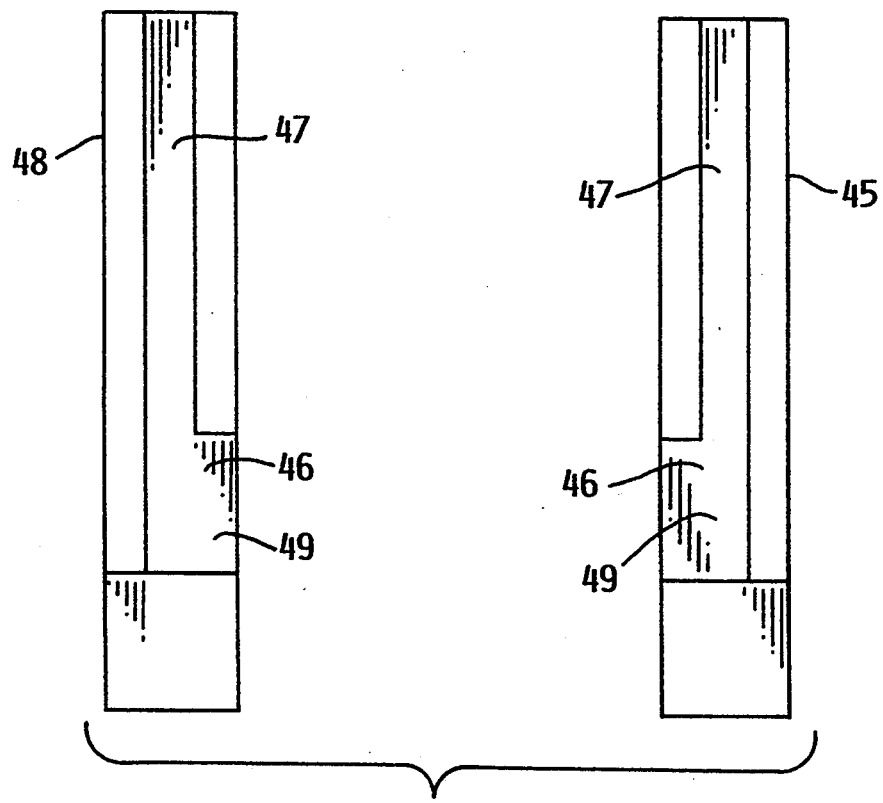
FIG. 8 shows a front view of the vertical guides.
Figure 9:
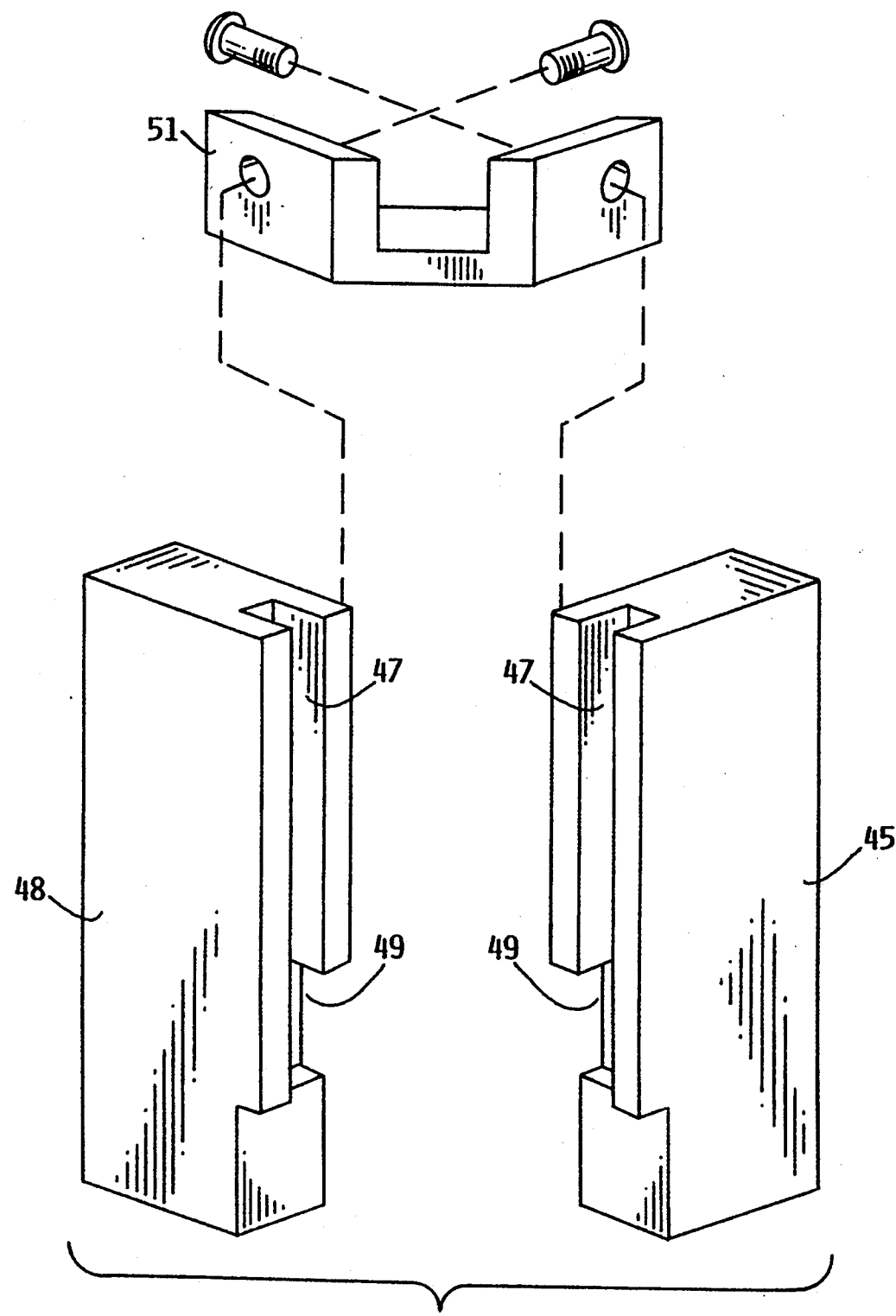
FIG. 9 shows a perspective of the horizontal guide and the vertical guides.

The upstacker and orientation collator 14 is shown in a perspective view in FIG. 1 with portions cut away. A 3½ inch diskette 15 with a metallic shutter 17 is shown as it is conveyed into the receiving slot 23 to a tray 54. A frame 20 includes a shelf 22 and a shelf 24. A stacking bin 80 is shown attached to the frame 20. Mounted on the shelf 22 is a bushing 81 supporting a shaft 30. The shaft 30 extends into a drive nut 35. A pair of vertical guides 45, 48 are mounted on the shelf 22 in a 90° orientation from each other with respect to the shaft 30 and drive nut 35. A horizontal guide 51 extends between the vertical guides 45, 48. As can be seen in the detail drawings of FIGS. 8 and 9, the shape of one vertical guide is the mirror image of the other. Shown in FIGS. 2–6 is an arm member 38 extending from the drive nut 35. The arm member 38 engages with the vertical guides 45, 48. A pair of bearing supports 34 and a pair of support shafts 25, 32 on which are mounted rollers 31 for conveying diskettes, can be most readily seen in FIG. 2.

A retaining means for supporting diskettes in the bin is shown in FIGS. 1, 2, 4, 5, and 6 and is comprised principally of two finger mounts 59 and four wedge-shaped finger members 55 which are attached to the finger mounts by screws 61 or other suitable means. The finger mounts are pivotally attached to opposite sides of the stacking bin 80 at screws 60. As shown in FIG. 1, a bias means comprised of spring 62 is connected between the finger mounts 59 and the bin by way of attachment ear 63.

Figure 3:
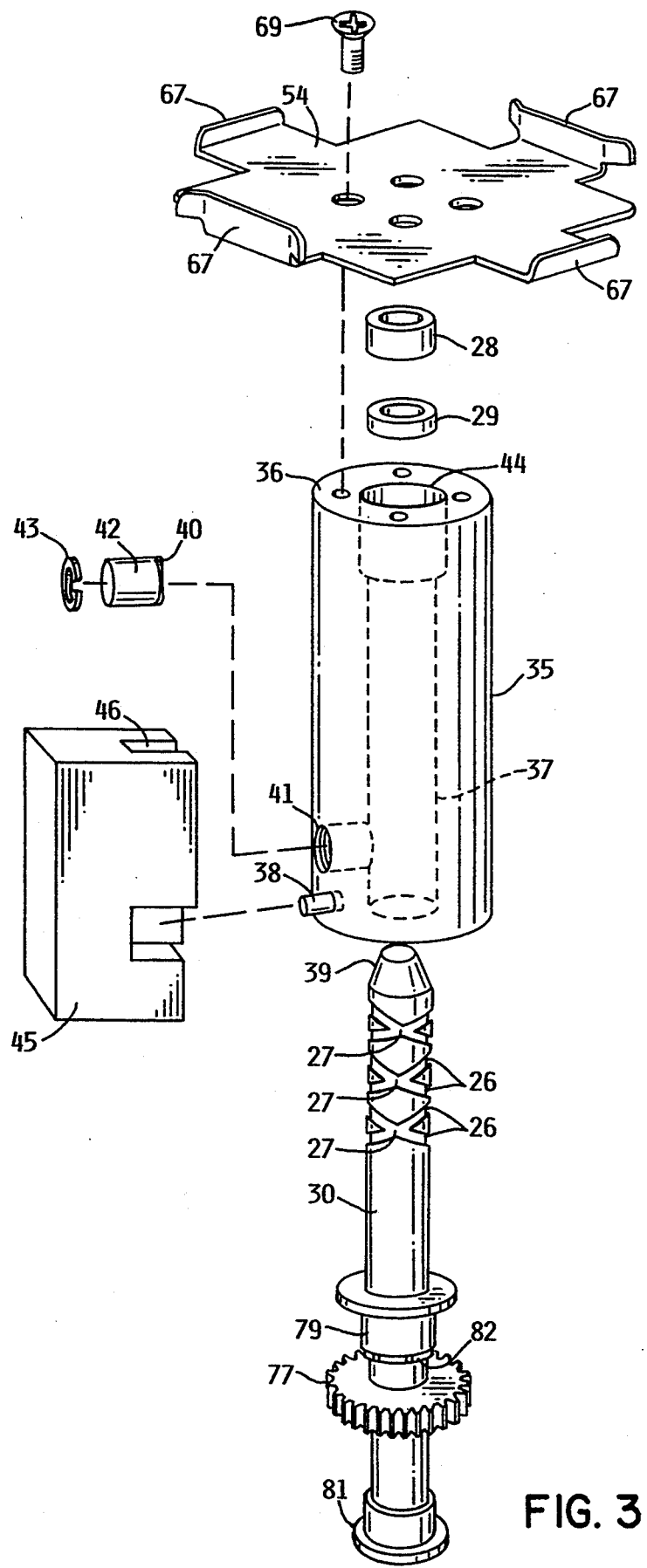
FIG. 3 is an exploded view showing the tray, the drive nut, the shaft, the pawl and a vertical guide.

FIG. 3 shows a screw means for coupling the drive nut 35 and shaft 30, comprised principally of the drive nut 35, the pawl 40, and the shaft 30 with a double helical groove 26. The drive nut 35 consists of a hollow cylinder with an axial bore 37, a larger diameter axial bore 44 and a top surface 36 onto which is mounted a tray 54 by four screws 69. The tray 54 is appropriately sized for computer diskettes. A means for swiveling the pawl is comprised principally of a pawl shaft 42 with a pawl 40 machined on the end and a pawl bore 41 shown extending radially into the drive nut 35. The pawl shaft 42 is suitably sized to be inserted within the bore 41 so that the pawl 40 extends into the axial bore 37. The pawl shaft 42 is held in place in the bore 41 by way of a spring clip 43. The shaft 30 has a double helical groove 26 which engages with the pawl 40 as shown in FIGS. 4, 5 and 6.

Figure 4:
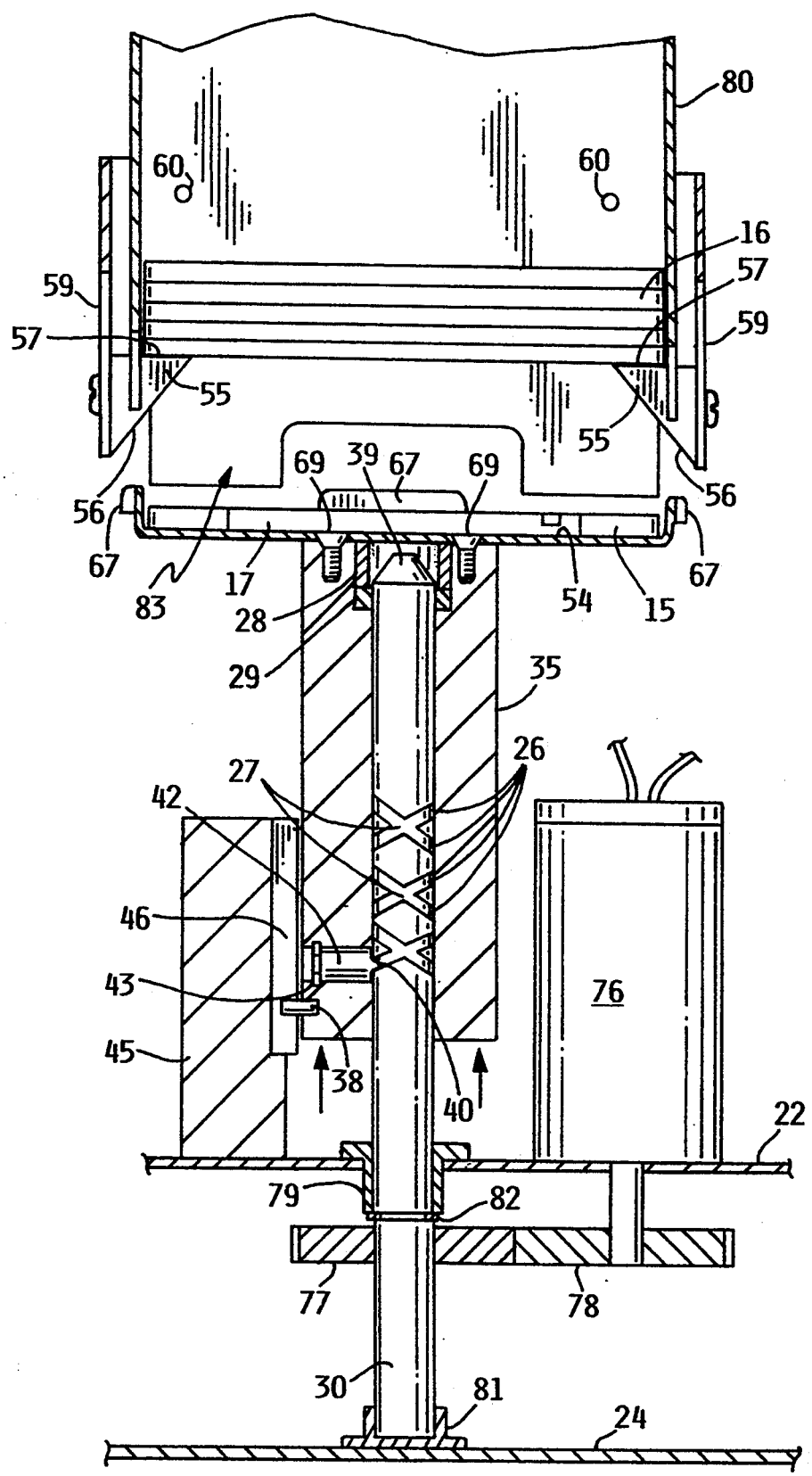
FIG. 4 is a sectional view taken at plane 4—4 of FIG. 2 showing the tray in the lowered position.
Figure 5:
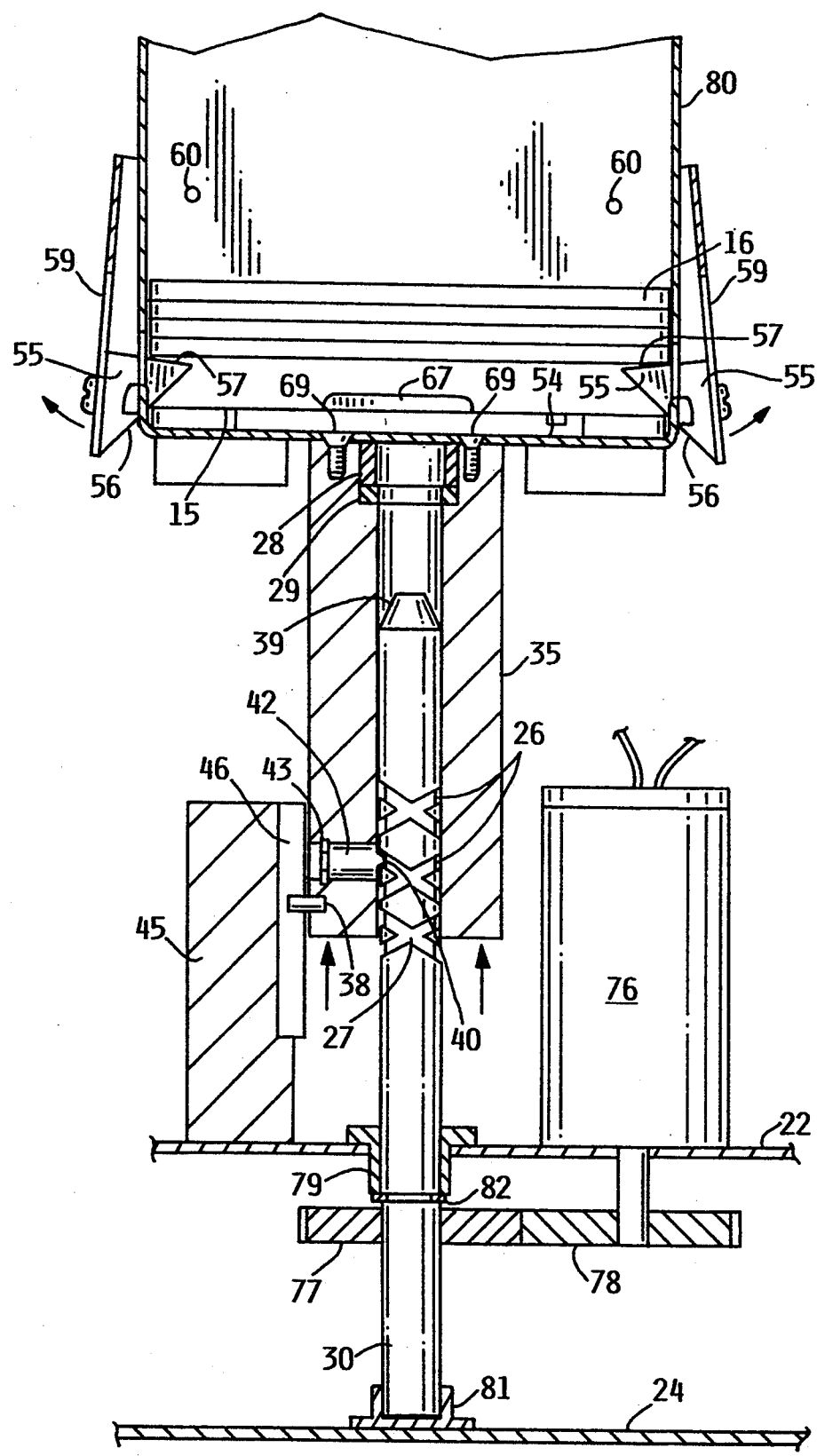
FIG. 5 is the same view as FIG. 4 showing the tray in a partially-raised position.
Figure 6:
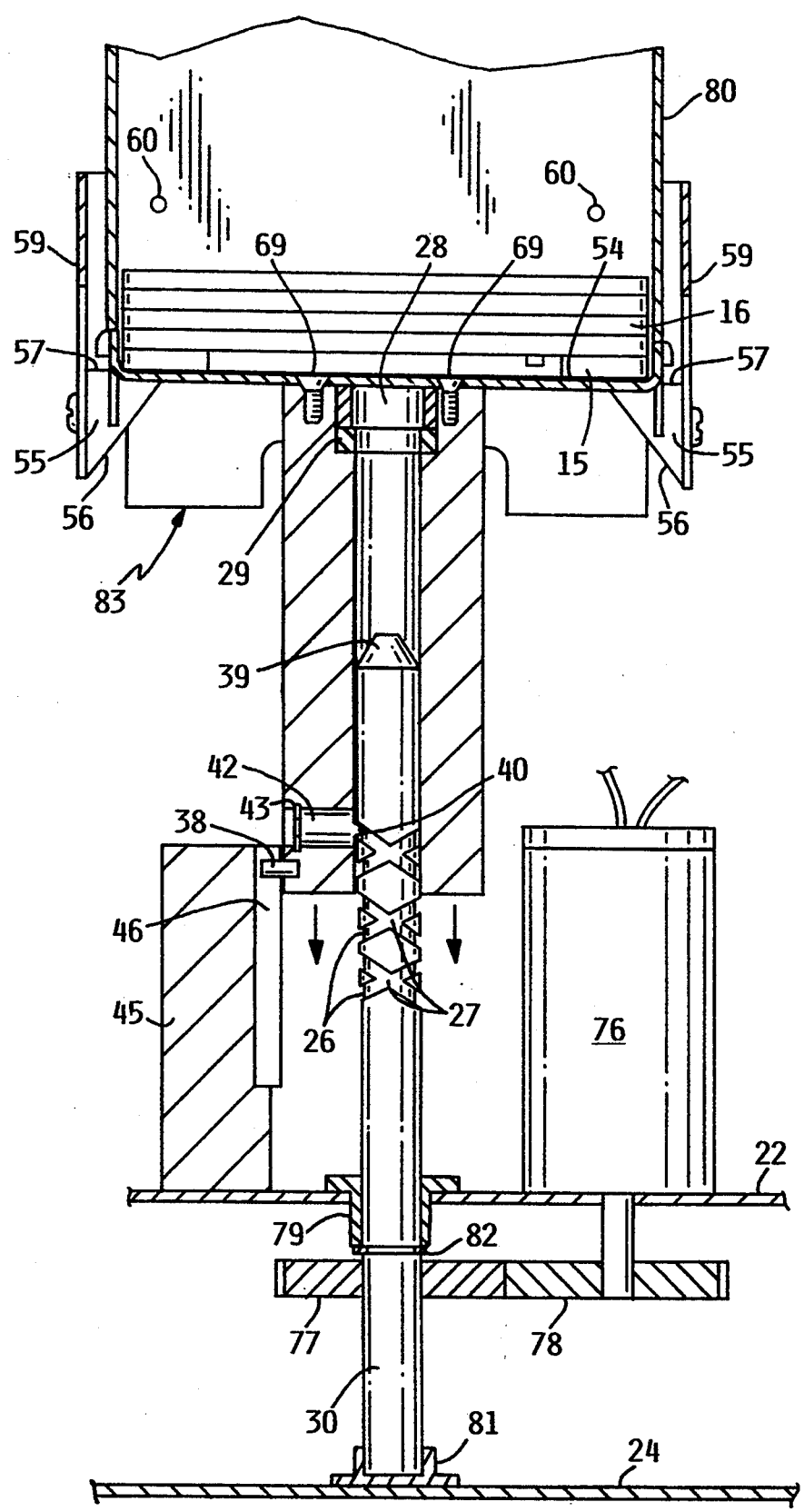
FIG. 6 is the same view as FIG. 4 showing the tray in the raised position.

A drive means can be seen in FIGS. 4, 5 and 6 which comprises a reversible motor 76 suitably mounted to the shelf 22. The motor 76 drives drive gear 78 meshed with a driven gear 77 which is fixed to the shaft 30. The shaft is supported by bushing 81 attached to the shelf 24, a bushing 79 attached to the shelf 22 and a ring 82.

Figure 2:
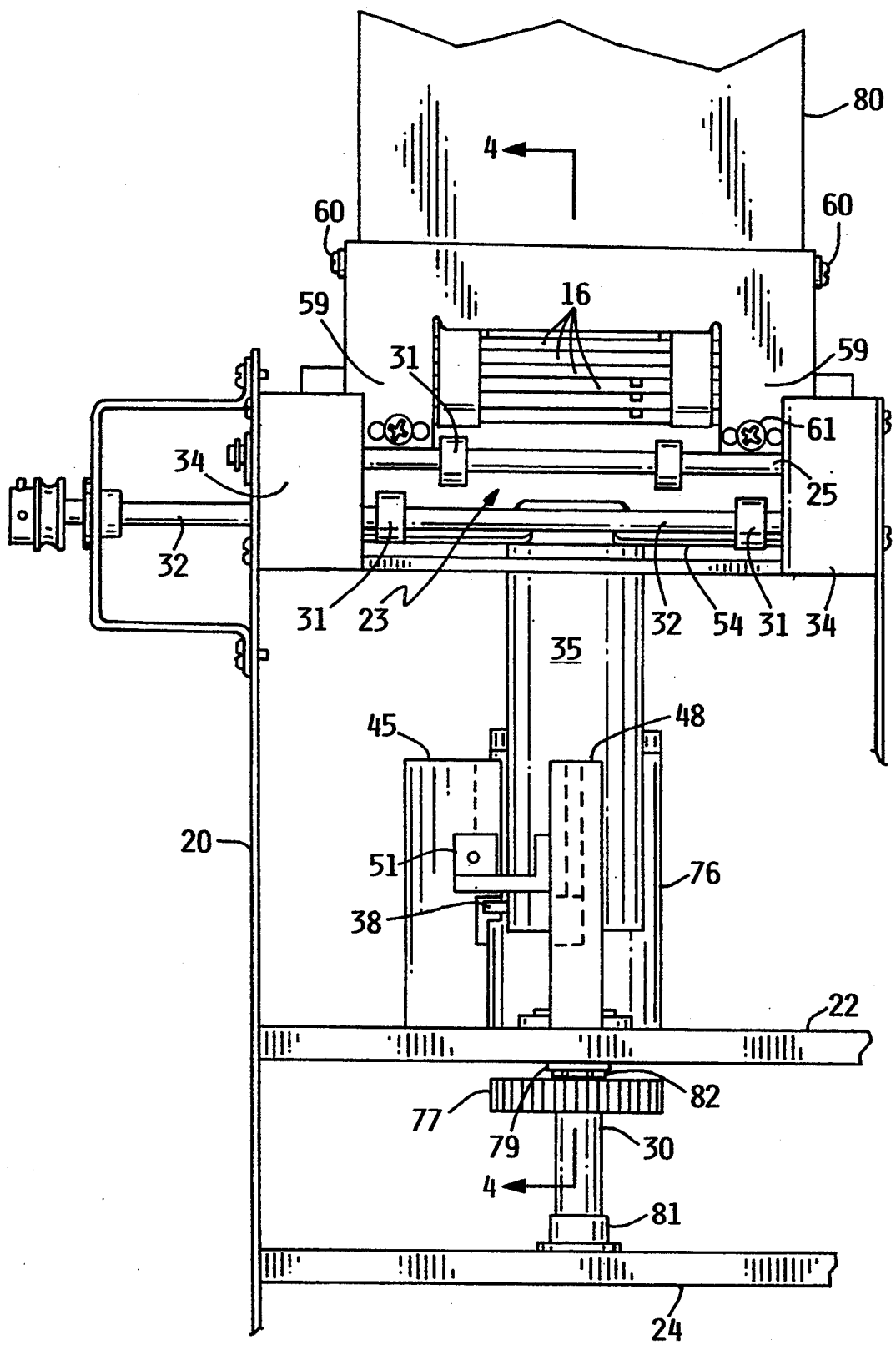
FIG. 2 is an elevational view of the invention.

The upstacker and orientation collator 14 operates as follows: Referring to FIGS. 1 and 2, a diskette 15 is conveyed by external means to the receiving slot 23 where it is engaged by the rollers 31 mounted on the upper shaft 25 and the lower shaft 32 which then convey the diskette 15 onto the tray 54. Shaft 32 is driven by external means. The retaining edges 67 on the tray 54 assist in proper placement of the diskette 15. FIGS. 1, 2 and 4 show the tray 54 and drive nut 35 in the lowered position to receive the diskette 15. FIG. 2 shows the receiving slot 23 in relation to the tray 54 in the lowered position.

When the diskette 15 is received by the tray 54, the motor 76 is engaged to rotate the drive gear 78, the driven gear 77 and the shaft 30. The shaft 30 may be rotated in either a clockwise or counterclockwise direction.

Rotation of the shaft 30 causes one of two effects: 1) the pawl 40 attached to the drive nut 35 tracks in the double helical groove 26 moving the drive nut 35 and tray 54 upwardly or downwardly; or 2) the pawl 40 does not track and the drive nut 35 rotates with the shaft 30. The effect that occurs is dependent on the direction of the rotation of the shaft 30 and on the position of the tray 54 and drive nut 35 with respect to the shaft 30. The position of the tray 54 and drive nut 35 corresponds directly to the position of the arm member 38 with respect to the vertical guides 45, 48 and the horizontal guide 51. The engagement of the arm member 38 in the vertical guides 45, 48 constitutes an interference means for restricting the rotation of the drive nut 35.

As depicted in FIGS. 1–4, when the tray 54 and drive nut 35 are in the lowered position the arm member 38 can rotate 90° between the vertical guides 45, 48 resulting in the swiveling of the tray 54. Additionally, when the tray 54 and drive nut 35 are in the lowered position the shaft 30 has entered the friction member 29. The friction member 29 is held in place by member 28 and in the preferred embodiment is a felt material. Other materials which are compressible and provide an increased resistance to rotation of the shaft 30, such as various plastic or rubber formulations, may also be used. A conical surface 22 eases the transition of shaft 30 into the friction member 29. Radial compression of the frictional member 29 by the shaft 30 provides a frictional means for increasing the friction between the shaft 30 and the drive nut 35 when the drive nut 35 is in the lowered position. This additional frictional resistance is sufficient to stop the tracking of the pawl 40 in the double helical groove 26 and to give priority to rotation of the drive nut 35 and tray 54 on the shaft 30 until the rotation is stopped by the arm member 38 engaging one of the vertical guides 45, 48. The horizontal guide 51 precludes any vertical motion when the drive nut 35 is in the lowered position and the arm member 38 is between vertical guides 45, 48.

As the shaft 30 is rotated in a clockwise direction, as viewed from above, the arm member 38 engages the first vertical guide 45 by entering the channel access 49 of the L-shaped channel 46. Engagement by the arm member 38 in the vertical channel 47 precludes the further rotation of the drive nut 35 and the tray 54 with the diskette 15. As the shaft 30 continues to rotate in a clockwise direction the tracking of the pawl 40 in the double helical groove 26 moves the drive nut 35, tray 54 and diskette 15 upwardly. As shown in FIG. 5, the diskette 15 contacts the inclined lower surface 56 of the wedge-shaped finger 55 causing the finger members 55 and the finger mounts 59 to pivot outwardly about the pivot screws 60 into a partially retracted position. As the tray 54 and diskette 15 are raised past the inclined lower surface 56 of the finger members 55 the finger members 55 and finger mounts 59 return to the retaining position under the diskettes 16 as shown in FIG. 6. It should be noted that the diskettes 16 stacked within the bin 80 are supported by the upper surface 57 of the wedge-shaped finger members 55 and continue to be supported by the finger members 55 until the finger members 55 are fully retracted by the diskette 15 at which point the tray 54 supports the diskettes 15 and 16.

A bias means, shown in the preferred embodiment as springs 62, operates to urge the finger members 55 into the retaining position. Other bias means would also be effective such as having the finger members 55 and finger mounts 59 appropriately balanced whereby their weight would urge the finger members 55 into the retaining position. Additionally the finger mounts 59 could be of a resilient material affixed to the bin rather than pivotally mounted.

The pawl 40 is shown to be at the highest portion of the double helical groove 26 in FIG. 6. Continued rotation of the shaft 30 results in the pawl 40 continuing to follow the double helical groove 26 downward, lowering the drive nut 35 and tray 54. In that the finger members 55 engage only with the diskettes and not the tray 54, the finger members remain in place as the drive nut 35 and tray 54 are lowered. The diskette 15 and diskettes 16 remain in the bin 80.

As the shaft 30 continues to rotate, the drive nut 35 and tray 54 reach the lowered position as best shown in FIG. 4. At this point an additional diskette is conveyed into the tray 54. If it is desired to directionally collate the next diskette to be stacked then the direction of rotation of the shaft may be reversed by reversing the motor 76. The increased friction between the shaft 30 and the drive nut 35, due to the engagement of the shaft 30 in the friction member 29, causes the arm member 38, the drive nut 35 and tray 54 to be rotated 90° with the shaft 30 until the arm member 38 enters the L-shaped channel 46 of the second vertical guide 48 at which point the arm member 38, the drive nut 35 and the tray 54 are obstructed in their continued rotation. Continued rotation of the shaft 30 overcomes friction between shaft 30 and the friction member 29 and drives the pawl 40 engaged in the double helical groove 26 upward again and consequently the drive nut 35, tray 54 and loaded diskette 15 also move upward to the bin opening 83 as before except that the tray 54 and diskette are 90° from the orientation of the previous diskette. As shown in FIG. 6, the metallic shutter 17 of diskette 15 is oriented toward the viewer to distinguish it from the rest of the stack 16. Thus, as the diskettes are stacked in the bin 80, singles or sets of the diskettes may be oriented in one direction and singles or sets may be stacked in the alternate direction resulting in a collation effect.

Figure 7:
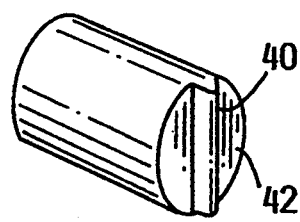
FIG. 7 shows a perspective of the pawl.

It should be noted that the pawl 40, as shown in detail with the pawl shaft 42 in FIG. 7, is of an elongate shape in order that it may follow the double helical groove 26 in an appropriate manner and not be diverted or hung up at the intersections 27 as shown in FIG. 3.

Although in this embodiment the double helical groove 26 is shown on the shaft 30, it could also be on the inside surface of the bore 37 and the drive nut 35 with the pawl 40 connected to the shaft 25.

The apparatus may be formed from sheet metal, aluminum and steel stock and fabricated by such conventional means as stamping, machining and welding.

The sequencing of the operations and the direction of rotation of the shaft are controlled by conventional electrical circuitry, not shown. Sensors, such as optical sensors, not shown, may be installed to monitor the positions of the various elements.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for vertically stacking and orienting articles which are conveyed into the apparatus comprising:
   a) a frame;
   b) a shaft with a continuous double helical groove extending longitudinally, the shaft rotatably mounted on the frame;
   c) a drive means comprising a reversible electric motor for rotating the shaft;
   d) a drive nut having a top end and a bore, the drive nut engaged on the shaft, the bore sized to allow the shaft to rotate therein;
   e) a tray to accept the conveyed articles, the tray attached to the top end of the drive nut;
   f) a pawl attached to the drive nut and engaged in the helical groove;
   g) an interference means for restricting the rotation of the drive nut, whereby rotation of the shaft tracks the pawl in the helical groove and vertically moves the drive nut and tray to a raised position and a lowered position; and whereby the drive nut and tray will cyclically raise and lower as the shaft is continuously rotated in a single direction;
   h) a stacking bin attached to the frame and oriented substantially vertically, the bin having a lower bin opening, the lower bin opening sized to fit the articles and positioned to receive the articles as the tray moves to its raised position; and
   i) a retaining means for supporting the articles in the bin after they have been received at the lower bin opening.

2. The apparatus of claim 1, wherein the pawl is elongate and further comprising a means for swiveling the pawl as it tracks in the double helical groove.

3. The apparatus of claim 1, wherein the retaining means comprises:
   a) a plurality of finger members attached to the bin retractably obstructing the bin opening;
   b) the finger members having an inclined lower surface and an upper surface;
   c) the finger members having a retaining position and a retracted position; whereby in the retaining position the finger members obstruct the bin opening and articles in the bin rest on the upper surface of the finger members and in the retracted position the receiver opening is unobstructed;
   d) a bias means for urging the finger members to the retaining position; and
   e) the inclined lower surface of the finger members positioned to engage the articles as they are raised in the tray, whereby the engagement retracts the finger members to the retracted position.

4. The apparatus of claim 3, wherein the finger members are pivotally mounted on the bin.

5. The apparatus of claim 4, wherein the bias means is comprised of a spring connected between the bin and finger members.

6. The apparatus of claim 1, wherein the interference means further comprises:
   a) an arm member extending radially from the drive nut, whereby the arm member rotates as the drive nut rotates and moves vertically as the drive nut moves vertically; and
   b) a first vertical guide and a second vertical guide both attached to the frame and positioned to engage the arm member whereby rotation of the drive nut is limited.

7. The apparatus of claim 6, wherein the rotation of the arm member and drive nut as limited by the arm member engaging the vertical guides defines an angle, and wherein the vertical guides are positioned so that the angle is 90°.

8. The apparatus of claim 7, further comprising a horizontal guide, the horizontal guide connecting the first vertical guide and the second vertical guide, the horizontal guide sized and positioned to prevent vertical movement of the arm member between the vertical guides.

9. The apparatus of claim 8, wherein the first vertical guide further comprises a vertical channel and a channel access and the second vertical guide further comprises a vertical channel and a channel access, the channel accesses positioned so that the arm member engages the vertical guides by way of the channel accesses when the drive nut is in the lowered position whereby the arm member and drive nut can only rotate when in the lowered position.

10. The apparatus of claim 8, further comprising a frictional means for providing friction between the shaft and the drive nut, the frictional means sufficient to substantially prevent movement of the pawl in the helical groove when the rotation of the arm member and drive nut is not limited by the vertical guides.

11. The apparatus of claim 10, wherein the frictional means comprises a compressible friction member positioned within the bore of the drive nut above the shaft, whereby the friction member is compressed when the drive nut is in the lowered position.

12. An apparatus for vertically stacking and orienting computer diskettes which are conveyed into the apparatus comprising:
  a) a frame;
  b) a shaft mounted on the frame;
  c) a drive means for rotating the shaft;
  d) a tray to accept the conveyed diskettes;
  e) a screw means for coupling the shaft and the tray to raise and lower the tray as the shaft is rotated whereby rotation of the shaft moves the tray between a lowered position and a raised position, the screw means comprising a drive nut with a bore sized to the shaft, the drive nut attached to the tray and engaged with the shaft with the shaft movable therein, the shaft having a first helical groove extending longitudinally and a second helical groove joined to the first helical grove, the two helical grooves forming a continuous double helical groove, a pawl attached to the drive nut and engaged in the continuous double helical groove, and an interference means for restricting the rotation of the drive nut, whereby the shaft may be rotated continuously and the tray will cyclically raise and lower as the shaft is continuously rotated in a single direction;
  f) a stacking bin attached to the frame and oriented substantially vertically, the bin having a lower bin opening, the lower bin opening sized to receive the diskettes and positioned to receive the diskettes as the tray moves to its raised position;
  g) a retaining means for supporting the diskettes in the bin after they have been received at the lower bin opening; and
  h) a swiveling means for selectively altering the orientation of the diskettes before they are received in the bin.

13. The apparatus of claim 12, further comprising a means for swiveling the pawl as it tracks in the double helical groove, and wherein the pawl is elongate.

14. The apparatus of claim 13, wherein the drive means is reversible and further comprising an electric motor.

15. The apparatus of claim 14, wherein the retaining means comprises:
  a) a plurality of finger members attached to the bin retractably obstructing the bin opening;
  b) the finger members having an inclined lower surface and an upper surface;
  c) the finger members having a retaining position and a retracted position; whereby in the retaining position the finger members obstruct the bin opening and articles in the bin rest on the upper surface of the finger members and in the retracted position the receiver opening is unobstructed;
  d) a bias means for urging the finger members to the retaining position; and
  e) the inclined lower surface of the finger members positioned to engage the articles as they are raised in the tray, whereby the engagement retracts the finger members to the retracted position.

16. The apparatus of claim 15, wherein the interference means further comprises:
  a) an arm member extending radially from the drive nut, whereby the arm member rotates as the drive nut rotates and moves vertically as the drive nut moves vertically; and
  b) a first vertical guide and a second vertical guide both attached to the frame and positioned to engage the arm member whereby rotation of the drive nut is limited.

17. The apparatus of claim 16, wherein the rotation of the arm member and the drive nut as limited by the arm member engaging the vertical guides defines an angle, and wherein the vertical guides are positioned so that the angle is 90°.

18. The apparatus of claim 17, further comprising a horizontal guide, bridging the first vertical guide and the second vertical guide, the horizontal guide sized and positioned to prevent vertical movement of the arm member between the vertical guides.

19. The apparatus of claim 18, wherein the first vertical guide further comprises a vertical channel and a channel access and the second vertical guide further comprises a vertical channel and a channel access, the channel accesses positioned so that the arm member engages the vertical guide by way of the channel accesses when the drive nut is in the lowered position whereby rotation of the arm member and drive member is limited to the lowered position.

20. The apparatus of claim 19, further comprising a frictional means for increasing the friction between the shaft and drive nut when the drive nut is in the lowered position.

21. The apparatus of claim 20, wherein the frictional means comprises a compressible friction member positioned within the bore of the drive nut so that the friction member is compressed by the shaft when the drive nut is in the lowered position.

* * * * *